(12) United States Patent
Fischer et al.

(10) Patent No.: US 11,079,591 B2
(45) Date of Patent: Aug. 3, 2021

(54) METHOD AND DEVICE FOR GENERATING A VISIBLE IMAGE ON A PROJECTION SURFACE

(71) Applicant: Robert Bosch GmbH, Stuttgart (DE)

(72) Inventors: Frank Fischer, Gomaringen (DE); Gael Pilard, Wankheim (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 16/330,525

(22) PCT Filed: Jul. 5, 2017

(86) PCT No.: PCT/EP2017/066762
§ 371 (c)(1),
(2) Date: Mar. 5, 2019

(87) PCT Pub. No.: WO2018/041445
PCT Pub. Date: Mar. 8, 2018

(65) Prior Publication Data
US 2020/0225465 A1 Jul. 16, 2020

(30) Foreign Application Priority Data
Sep. 5, 2016 (DE) .......................... 102016216764.2

(51) Int. Cl.
*G02B 26/10* (2006.01)
*G03B 21/00* (2006.01)
*G03B 21/20* (2006.01)

(52) U.S. Cl.
CPC ......... *G02B 26/101* (2013.01); *G03B 21/008* (2013.01); *G03B 21/2033* (2013.01)

(58) Field of Classification Search
CPC .............. G02B 26/101; G02B 26/0816; G02B 26/0833; G02B 26/0841; G02B 26/105;
(Continued)

(56) References Cited

U.S. PATENT DOCUMENTS

| 2010/0085631 A1 | 4/2010 | Kusukame et al. |
| 2015/0296150 A1 | 10/2015 | Benmokhtar Benabdellah et al. |
| 2016/0080709 A1 | 3/2016 | Viswanathan et al. |

FOREIGN PATENT DOCUMENTS

| JP | H08152320 A | 6/1996 |
| JP | 2003029201 A | 1/2003 |

(Continued)

OTHER PUBLICATIONS

International Search Report for PCT/EP2017/066762, dated Oct. 10, 2017.
(Continued)

*Primary Examiner* — Kimberly N. Kakalec
(74) *Attorney, Agent, or Firm* — Norton Rose Fulbright US LLP; Gerard Messina

(57) ABSTRACT

A method is described for generating a visible image on a projection surface, in the course of which visible light is emitted from a first laser resonator, the visible light is deflected in the direction of the projection surface with the aid of a deflection element, in particular a micromirror, in order to generate the image, and a light spot of visible light is generated on the deflection element, and invisible light is emitted from a second laser resonator, and a light ring is generated on the deflection element from the invisible light, which enlarges the light spot.

21 Claims, 4 Drawing Sheets

(58) Field of Classification Search
CPC .............. G03B 21/008; G03B 21/2033; G03B 21/2053; G06F 3/0423; G06F 3/0325; H04N 9/3164; H04N 9/3129; F21V 9/40
See application file for complete search history.

(56) References Cited

FOREIGN PATENT DOCUMENTS

| | | | |
|---|---|---|---|
| JP | 2010538685 | A | 12/2010 |
| WO | 2012155125 | A1 | 11/2012 |

OTHER PUBLICATIONS

International Electrotechnical Commission: "IEC 60825-1 Safety of Laser Products", International Standard, 2001, pp. 1-122, XP055373197, https://shop.textal k.se/shop/ws26/4062 6/fi les/ful l size - for start page banner/ IEC60825-L {EDL.2}ENP.

METHOD AND DEVICE FOR GENERATING A VISIBLE IMAGE ON A PROJECTION SURFACE

FIELD OF THE INVENTION

The present invention is based on a method for generating a visible image on a projection surface, in the process of which visible light is emitted from a first laser resonator, the visible light is deflected in the direction of the projection surface with the aid of a deflection element, in particular a micromirror, in order to generate the image, and a light spot of visible light is generated on the deflection element. In addition, the present invention is based on a device.

BACKGROUND INFORMATION

Such projection methods are used in miniaturized projection devices for mobile communications devices such as mobile telephones, smartphones, tablet computers and laptops. These devices normally have a laser resonator and one or more deflection element(s) in the form of micromirrors for deflecting the light emitted from the laser resonator. The laser resonator generates a light spot on the micromirror whose image is guided onto the projection surface by a deflection of the micro mirror. In this way the projection surface is gradually scanned using visible light so that an image is created that a viewer is able to perceive.

In such projection devices it is often desired that additional functions are provided such as the possibility to detect objects within the projection area. For example, it is desirable to allow for an interactive projection with which the user of the device is able to interact. This usually requires that an additional laser resonator be provided, which emits light in a different wavelength range.

In this context it has shown to be disadvantageous that the radiant power emitted in total by the laser resonators is restricted by safety specifications that are meant to prevent undesired harm to the eyes. When adding additional laser resonators, it is therefore often necessary to reduce the radiant power of the particular laser resonator that generates the visible image on the projection surface. However, this reduces the brightness of the image on the projection surface visible to the viewer.

SUMMARY

Against this background, it is an object of the present invention to enable the availability of additional functions through a further laser resonator without any adverse effect on the brightness of the projected image.

In contrast to the related art, the method of the present invention and the device of the present invention have the advantage that the light spot on the deflection element is enlarged by a light ring which is provided by the additional laser resonator. This does enlarge the light spot imaged on the projection surface. However, since the light ring is generated from light that is invisible to the viewer of the projection surface, there is no adverse effect on the perceivable image quality of the image on the projection surface. In addition, with an enlarged light spot, the safety regulations also permit an overall greater radiant power of the laser resonators that generate the light spot. This means that the radiant power of the first laser resonator which generates the image visible on the projection surface is able to be maintained so that the brightness of the image on the projection surface will not be reduced.

The laser resonator preferably is a laser resonator of a semiconductor laser. The deflection element is preferably a micromirror, especially preferably a micromirror developed as a MEMS (microelectromechanical system). Alternatively, the deflection element may be developed as a semitransparent mirror, e.g., made of glass.

According to one preferred embodiment, the invisible light emitted from the second laser resonator is imaged on the deflection element with the aid of an optical element in order to generate the light ring. A collimating lens which has a Fresnel ring, for example, may be used as an optical element. As an alternative, a diffractive optical element (DOE) or a holographic optical element (HOE) may be used to generate the light ring on the deflection element.

It is advantageous if the light ring generated from invisible light and the light spot generated from visible light overlap in an overlap region which has an area that encompasses maximally 5% of the area of the light spot, preferably maximally 3% of the area of the light spot, and most preferably, maximally 1% of the area of the light spot. Through the choice of an overlap region having such a small area, the light emitted from the second laser resonator is able to be used virtually entirely for enlarging the light spot.

According to one advantageous embodiment, the invisible light is infrared light, in particular infrared light having a wavelength in the range of 780 nm to 1000 nm, preferably in the range of 780 nm to 3000 nm, e.g. 850 nm. The visible light that is emitted from the first laser resonator may have a wavelength in the range of 380 nm to 780 nm.

One preferred embodiment provides that the invisible light is reflected at the projection surface and detected. On the basis of the detected invisible light, inferences may be drawn with regard to the distance between the laser resonator and/or the deflection element on the one hand and the projection surface on the other hand. Alternatively or additionally, the detection of the reflected light makes it possible to determine a surface condition of the projection surface such as its reflectivity.

According to one preferred embodiment, the visible light is emitted from a plurality of first laser resonators, the light of the plurality of first laser resonators having different wavelengths. The use of a plurality of laser resonators which emit light of different colors makes it possible to project a multi-color image onto the projection surface. It is possible to superpose the colors so that mixed colors result. For example, three first laser resonators which emit red, blue and green light may be used.

According to one preferred embodiment, the deflection element, in particular the micromirror, for deflecting the laser light is pivoted about a first pivot axis so that the laser light is able to be guided across the projection surface along a first direction. As a result, a first dimension of the projection surface is able to be scanned. Especially preferably, the deflection element, in particular the micromirror, for deflecting the laser light is additionally pivoted about a second pivot axis, which is disposed transversely, in particular perpendicular, to the first pivot axis, so that the laser light is able to be guided across the projection surface along a second direction. It is therefore possible to scan two dimensions of the projection surface.

According to an alternative embodiment, the visible light for generating the image is first deflected with the aid of a first deflection element, in particular a first micromirror, and then with the aid of a second deflection element, in particular a second micromirror, and the light spot and the light ring are generated on the first deflection element. Preferably, the first deflection element is pivoted about a first pivot axis, and the second deflection element is pivoted about a second pivot axis, which is disposed transversely, in particular perpendicular, to the first pivot axis.

In addition, it has shown to be advantageous if the distance between the deflection element and the projection surface is ascertained and a radiant power of the first laser resonator and/or the second laser resonator is adjusted as a function of the ascertained distance. The maximally permitted radiant power according to the current safety specifications for laser projection devices is often a function of the distance to the projection surface.

Ascertaining the distance, e.g., with the aid of a distance sensor or a proximity sensor, makes it possible to adjust the radiant power of the laser resonators in such a way that it does not exceed the permitted value for the respective distance to the projection surface.

In this context, it is particularly preferred if the radiant power of the first laser resonator and/or the second laser resonator is reduced when the ascertained distance is below a predefined minimum distance. For example, the radiant power may be adjusted to the maximally permitted radiant power according to the respective safety regulations. Alternatively, the radiant power may be reduced to zero so that the first laser resonator and/or the second laser resonator does/do not emit any light at this setting.

The advantageous features described in the previous text in connection with the method for generating a visible image on a projection surface may also be used in the device according to the present invention for generating a visible image on a projection surface, either on their own or in combination.

Exemplary embodiments of the present invention are shown in the drawing and described in greater detail in the following description.

DETAILED DESCRIPTION

Figure 1:
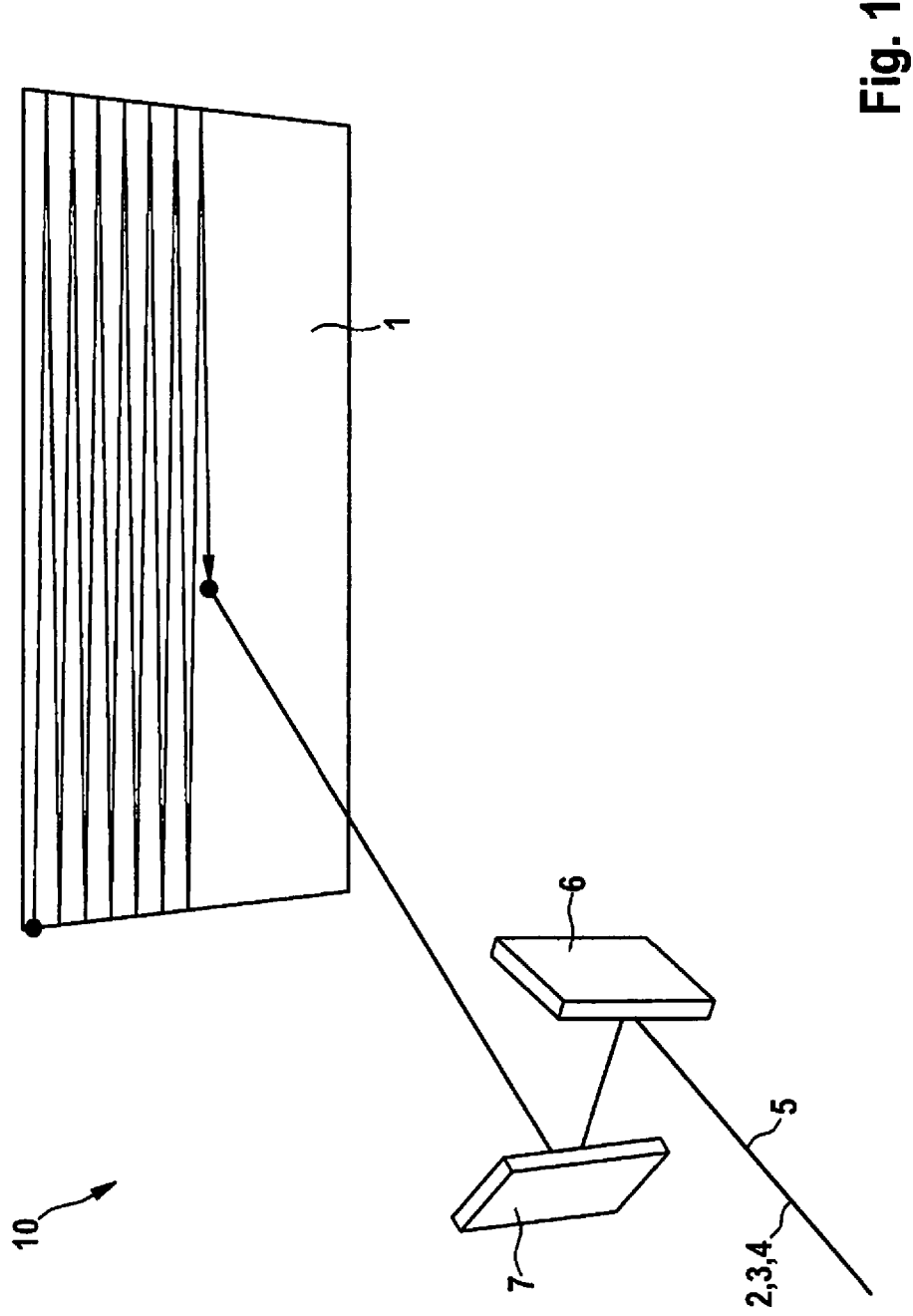
FIG. 1 shows a first exemplary embodiment of a device according to the present invention for generating a visible image on a projection surface, in a schematic illustration.

Similar parts in the various figures have been provided with the same reference numerals in all instances and are therefore also denoted or mentioned only once.

In FIG. 1, a first exemplary embodiment of a device 10 for generating a visible image on a projection surface 1 according to one exemplary embodiment of the present invention is shown. The device has a plurality of first laser resonators, which are not shown in the figures, via which visible light 2, 3, 4 having different wavelengths is generated. The laser resonators may be laser resonators of a semiconductor laser, for instance. The first laser resonators preferably generate visible red light 2, visible yellow light 3, and visible blue light 4 so that the colors of the RGB color spectrum are able to be produced through additive mixing of these three light quantities. It is therefore possible to generate a multi-color image on projection surface 1.

In addition, device 10 has a second laser resonator, which is likewise not shown. The second laser resonator emits invisible light 5, i.e. light having a wavelength that lies outside the wavelength range of 380 nm to 780 nm that persons are able to perceive. According to the present exemplary embodiment, invisible light 6 is infrared light, which has a wavelength in a range of 780 nm to 1000 nm, preferably in a range of 780 to 3000 nm, e.g., 850 nm. The invisible light is used in device 10 in order to allow for the detection of objects on projection surface 1, e.g. the detection of a finger of a user. Invisible light 5 is reflected at projection surface 1 and detected by a detection device of device 10. In this way, for example, an interactive projection and input device is able to be produced.

Visible light 2, 3, 4 emitted from the first laser resonators and invisible light 5 emitted from the second laser resonator is deflected in the direction of projection surface 1 with the aid of a first deflection element 6 and a second deflection element 7. First deflection element 6 and second deflection element 7 are developed as micromirrors, in particular as micromirrors in the form of a MEMS. First deflection element 6 is pivotable about a first pivot axis and second deflection element 7 is pivotable about a second pivot axis, the first and the second pivot axes being situated transversely, in particular perpendicular, to each other. To generate the image on projection surface 1, first deflection element 6 is pivoted, in particular periodically, about the first pivot axis, and second deflection element 7 is pivoted, in particular periodically, about the second pivot axis so that projection surface 1 is scanned line by line or column by column.

Visible light 2, 3, 4 generates a light spot 8 having a diameter D on first deflection element 6. According to the present invention, invisible light 5 generates a light ring 9 on first deflection element 6, which enlarges light spot 8 generated from visible light 2, 3, 4 such that an enlarged light spot 8' is generated on first deflection element 6.

Figure 2:
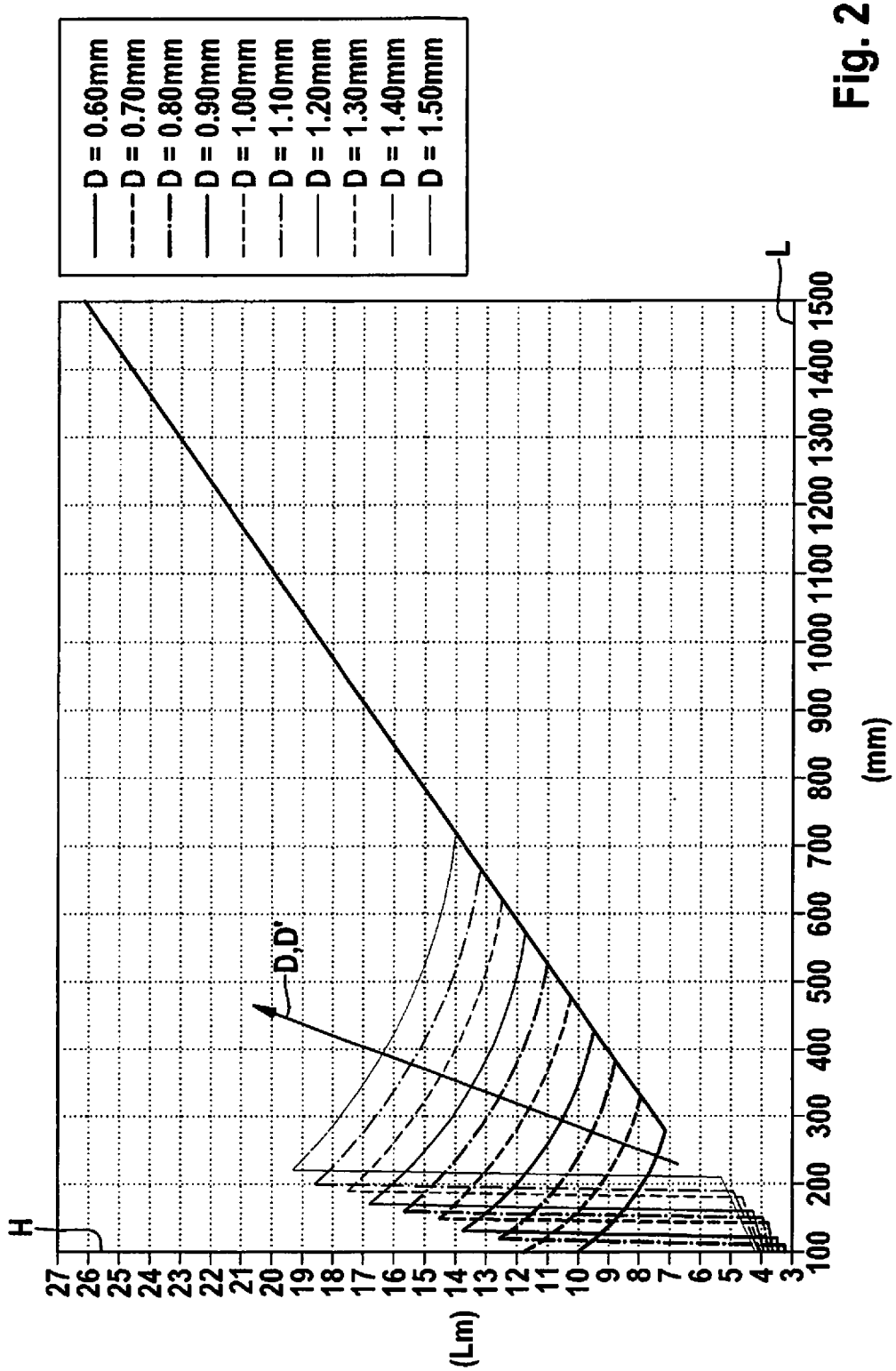
FIG. 2 shows a diagram of the maximally permitted brightness of a device according to FIG. 1 as a function of the distance to the projection surface for different sizes of the light spot.

FIG. 2 shows maximally permitted brightness H of device 10 from FIG. 1 according to laser safety standard IEC 60825-1 Ed3 for lasers of Class 2. Brightness H in lumen is plotted over distance L of first deflection element 6 to projection surface 1. Diameter D, D' of light spot 8, 8', which is generated by light 2, 3, 4, 5 that impinges upon the first deflection element, is denoted as a parameter of brightness H. It can be gathered that maximally permitted brightness H increases as diameter D, D' of light 2, 3, 4, 5 impinging upon first deflection element 6 becomes larger. This means that when a greater diameter D, D' of light spot 8, 8' on first deflection element 6 is selected, a greater total brightness H is achievable on projection surface 1.

Figure 3:
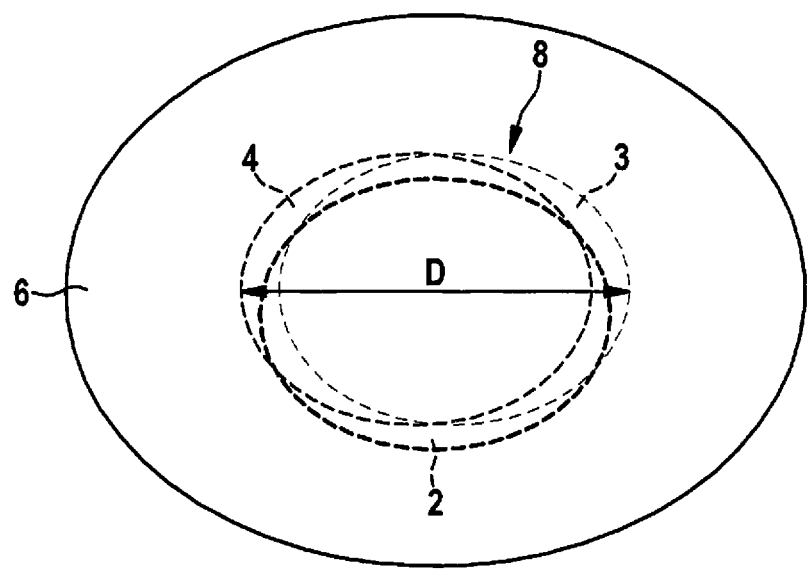
FIG. 3 shows a visible light spot generated by three laser resonators.

FIG. 3 shows a light spot 8, which is generated by visible light 2, 3, 4 of the three first laser resonators. Visible light 2, 3, 4 superposes in such a way that a non-circular light spot 8 is formed. In a deviation therefrom, light spot 8 may be circular. The greatest possible distance between two points on the demarcation line of light spot 8 is understood as diameter D of light spot 8.

Figure 4:
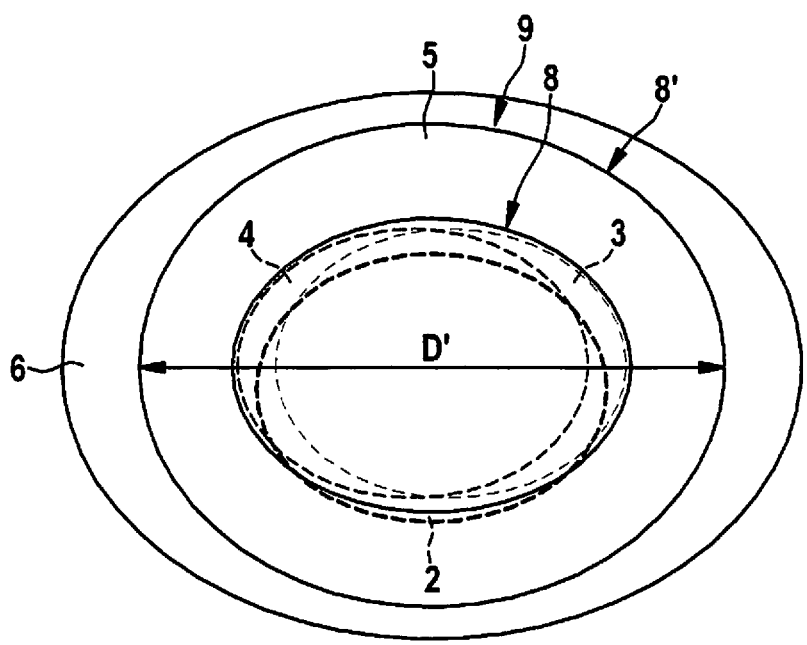
FIG. 4 shows a light spot generated by four laser resonators according to one exemplary embodiment of the present invention.

As illustrated in FIG. 4, invisible light 5 that is emitted from second laser resonator generates a light ring 9, which enlarges visible light spot 8 to a light spot 8' that has a larger diameter D' than diameter D of visible light spot 8. An optical element, in particular a collimating lens provided with a Fresnel ring, or a diffractive optical element or a holographic optical element may be used to generate light ring 9.

Light ring 9 generated from invisible light 5 and light spot 8 generated from visible light 2, 3, 4 overlap in an overlap region that has an area which encompasses maximally 5% of the area of light spot 8, preferably maximally 3% of the area of light spot 8, and most preferably, maximally 1% of the area of light spot 8.

Figure 5:
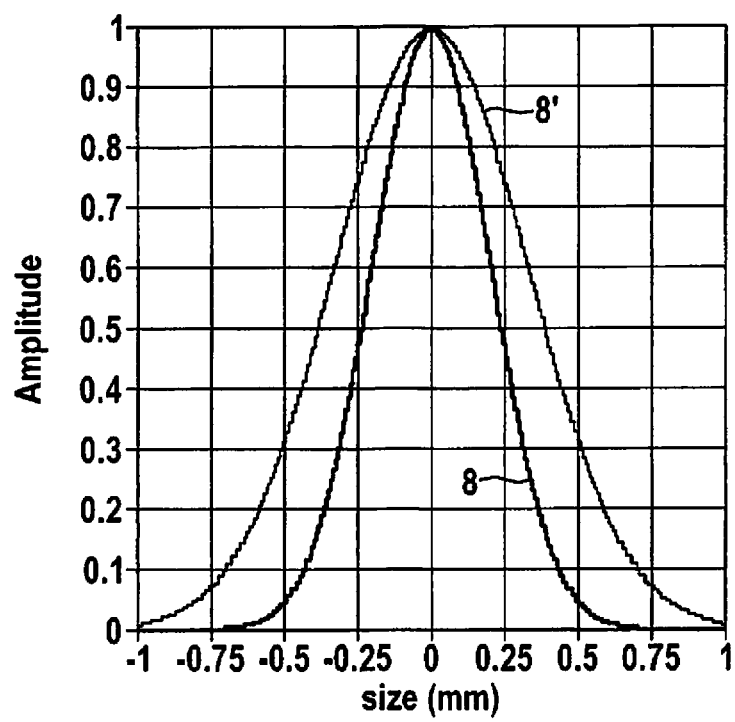
FIG. 5 shows a light distribution of the light spots according to FIG. 3 and FIG. 4.
Figure 6:
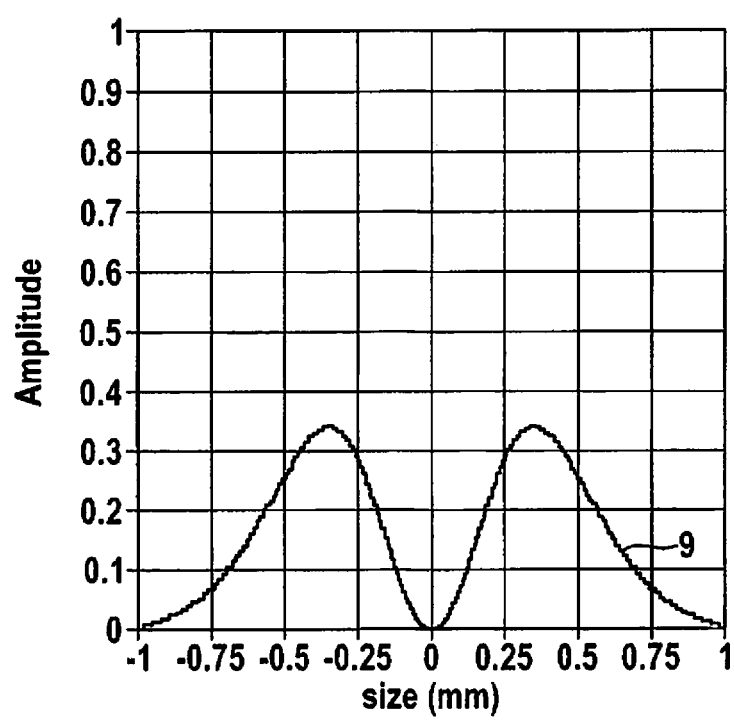
FIG. 6 shows a light distribution of the invisible light for generating a light ring.

FIG. 5 shows the distribution of the luminous flux of visible light 2, 3, 4 on first deflection element 6 which generates visible light spot 8. In addition, FIG. 5 shows the distribution of the luminous flux of enlarged light spot 8' which is generated from visible light spot 8 and invisible light ring 9. FIG. 6 shows the distribution of the luminous flux of invisible light 5 which generates light ring 9 on first deflection element 6.

In addition, distance L between deflection element 6 and projection surface 1 is ascertained in device 10 for generating a visible image on a projection surface. A distance sensor or a proximity sensor, for example, may be used for ascertaining this distance L. Depending on ascertained distance L, the radiant power of the first laser resonators and/or the second laser resonator is adjusted. More specifically, the radiant power of the first laser resonators and/or the second resonator is reduced if ascertained distance L drops below a predefined minimum distance. The radiant power is preferably adjusted to the maximally permitted radiant power for ascertained distance L. As an alternative, the radiant power may be reduced to zero if the minimum distance is not attained so that the first laser resonators and/or the second laser resonator do/does not emit any light at this setting.

These measures make it possible to avoid an exceeding of the maximally allowed radiant power or brightness at a low distance L. Such a situation may occur, for example, when an object or a person enters the region between first deflection element 6 and projection surface 1 so that the light 2, 3, 4, 5 deflected at first deflection element 6 falls on the object or the person.

Using the afore-described device 10, a visible image is able to be generated on a projection surface 1, in the process of which visible light 2, 3, 4 is emitted from a first laser resonator, visible light 2, 3, 4 is deflected in the direction of projection surface 1 with the aid of a deflection element 6, in particular a micromirror, in order to generate the image, and a light spot 8 of visible light 2, 3, 4 is generated on deflection element 6, invisible light 5 is emitted from a second laser resonator, and a light ring 9 is generated from invisible light 5 on deflection element 6, which enlarges light spot 8. This makes it possible to use a second laser resonator, for instance for the integration of additional functions, in the device without having to accept a restriction of the brightness of the projected image.

What is claimed is:

1. A method for generating a visible image on a projection surface, comprising:
    emitting visible light from a first laser resonator;
    deflecting the visible light in a direction of the projection surface with the aid of a deflection element in order to generate the image;
    generating a light spot of the visible light on the deflection element;
    emitting invisible light from a second laser resonator; and
    generating a light ring from the invisible light on the deflection element, the deflection element enlarging the light spot.

2. The method as recited in claim 1, wherein the deflection element includes a micromirror.

3. The method as recited in claim 1, wherein the invisible light emitted from the second laser resonator is imaged onto the deflection element in order to generate the light ring with the aid of an optical element.

4. The method as recited in claim 3, wherein the optical element includes one of a collimation lens provided with a Fresnel ring, a diffractive optical element, and a holographic optical element.

5. The method as recited in claim 1, wherein the light ring and the light spot overlap in an overlap region which has an area that encompasses maximally 5% of an area of the light spot.

6. The method as recited in claim 1, wherein the light ring and the light spot overlap in an overlap region which has an area that encompasses maximally 3% of an area of the light spot.

7. The method as recited in claim 1, wherein the light ring and the light spot overlap in an overlap region which has an area that encompasses maximally 1% of an area of the light spot.

8. The method as recited in claim 1, wherein the invisible light is infrared light.

9. The method as recited in claim 8, wherein the infrared light has a wavelength in a range of 780 nm to 1000 nm.

10. The method as recited in claim 8, wherein the infrared light has a wavelength in a range of 780 nm to 3000 nm.

11. The method as recited in claim 8, wherein the infrared light has a wavelength of 850 nm.

12. The method as recited in claim 1, wherein the invisible light is reflected at the projection surface and detected.

13. The method as recited in claim 1, wherein the visible light is emitted from a plurality of first laser resonators, and wherein light from respective ones of the first laser resonators having different wavelengths.

14. The method as recited in claim 1, wherein:
    the visible light for generating the image is initially deflected with the aid of a first deflection element, and then with the aid of a second deflection element, and
    the light spot and the light ring are generated on the first deflection element.

15. The method as recited in claim 14, wherein the first deflection element is a first micromirror.

16. The method as recited in claim 14, wherein the second deflection element is a second micromirror.

17. The method as recited in claim 1, further comprising:
    ascertaining a distance between the deflection element and the projection surface; and
    adjusting a radiant power of at least one of the first laser resonator and the second laser resonator as a function of the ascertained distance.

18. The method as recited in claim 17, further comprising:
    reducing the radiant power if the ascertained distance drops below a predefined minimum distance.

19. The method as recited in claim 18, wherein the radiant power is reduced to zero.

20. A device for generating a visible image on a projection surface, comprising:
    a first laser resonator for emitting visible laser light;
    a deflection element for deflecting the visible laser light in a direction of the projection surface in order to generate the image, wherein the first laser resonator is aligned in such a way that a light spot is able to be generated on the deflection element from the visible light; and
    a second laser resonator for emitting invisible light, wherein a light ring is able to be generated from the invisible light on the deflection element, and wherein the deflection element enlarges the light spot.

21. The device as recited in claim 20, wherein the first deflection element is a micromirror.

* * * * *